July 15, 1969
E. R. LIGON ETAL
3,454,997
CERAMIC MOLDING APPARATUS
Filed Nov. 30, 1965
6 Sheets-Sheet 1
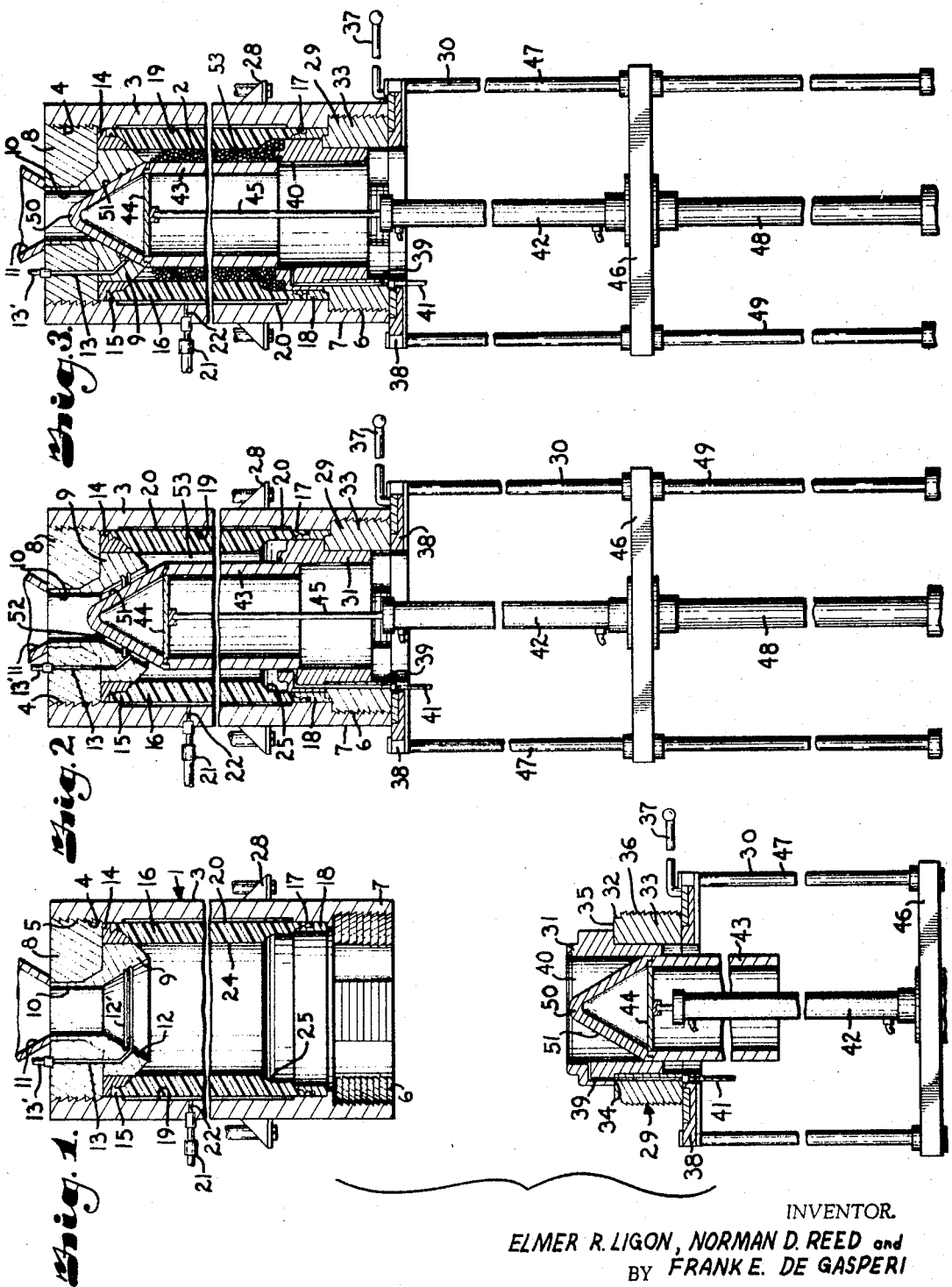
INVENTOR.
ELMER R. LIGON, NORMAN D. REED and
BY FRANK E. DE GASPERI
Fishburn & Gold
ATTORNEYS July 15, 1969
E. R. LIGON ETAL
CERAMIC MOLDING APPARATUS
3,454,997
Filed Nov. 30, 1965
6 Sheets-Sheet 2
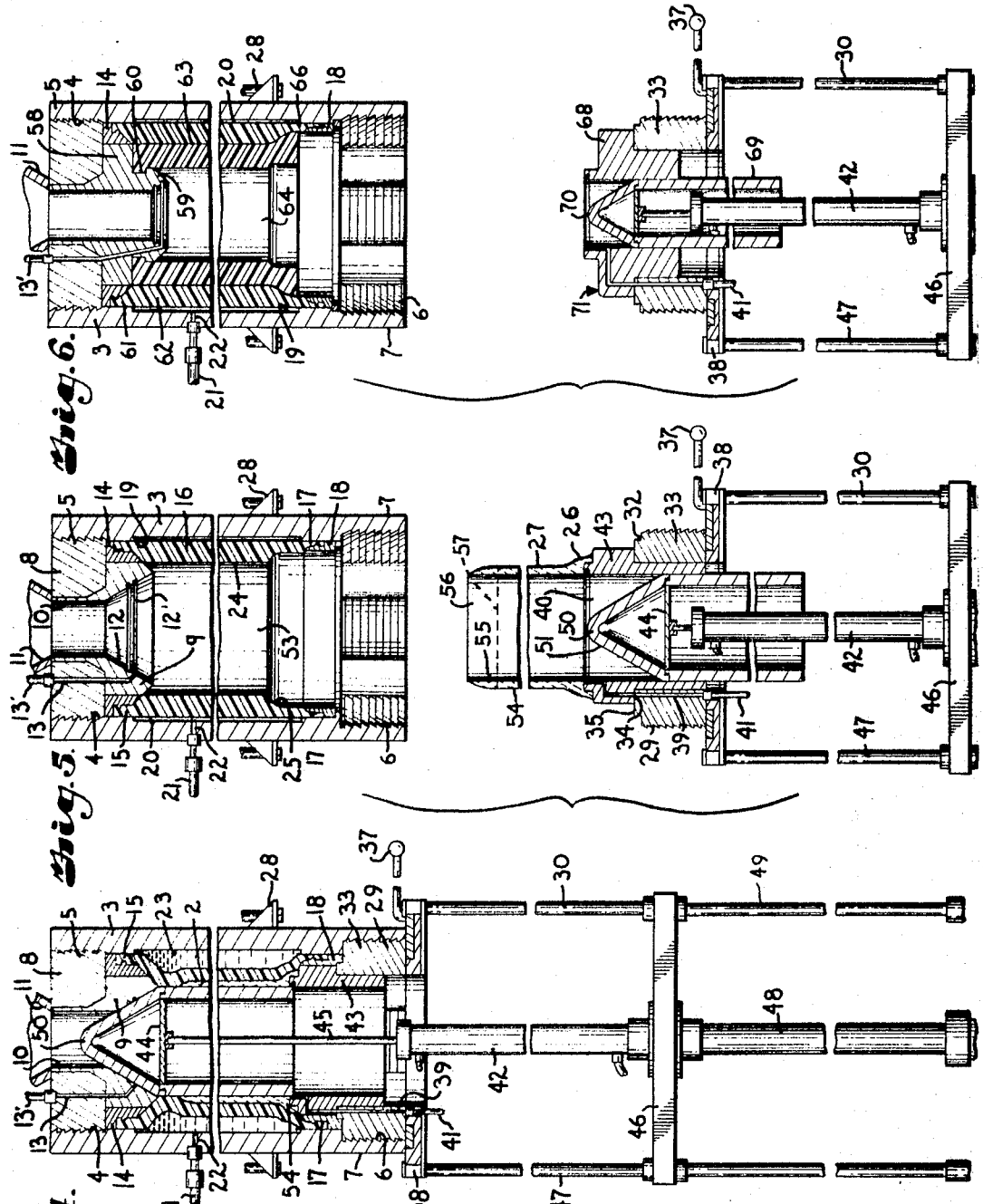
INVENTOR.
ELMER R. LIGON, NORMAN D. REED and
FRANK E. DE GASPERI
BY
Fishburn & Gold
ATTORNEYS

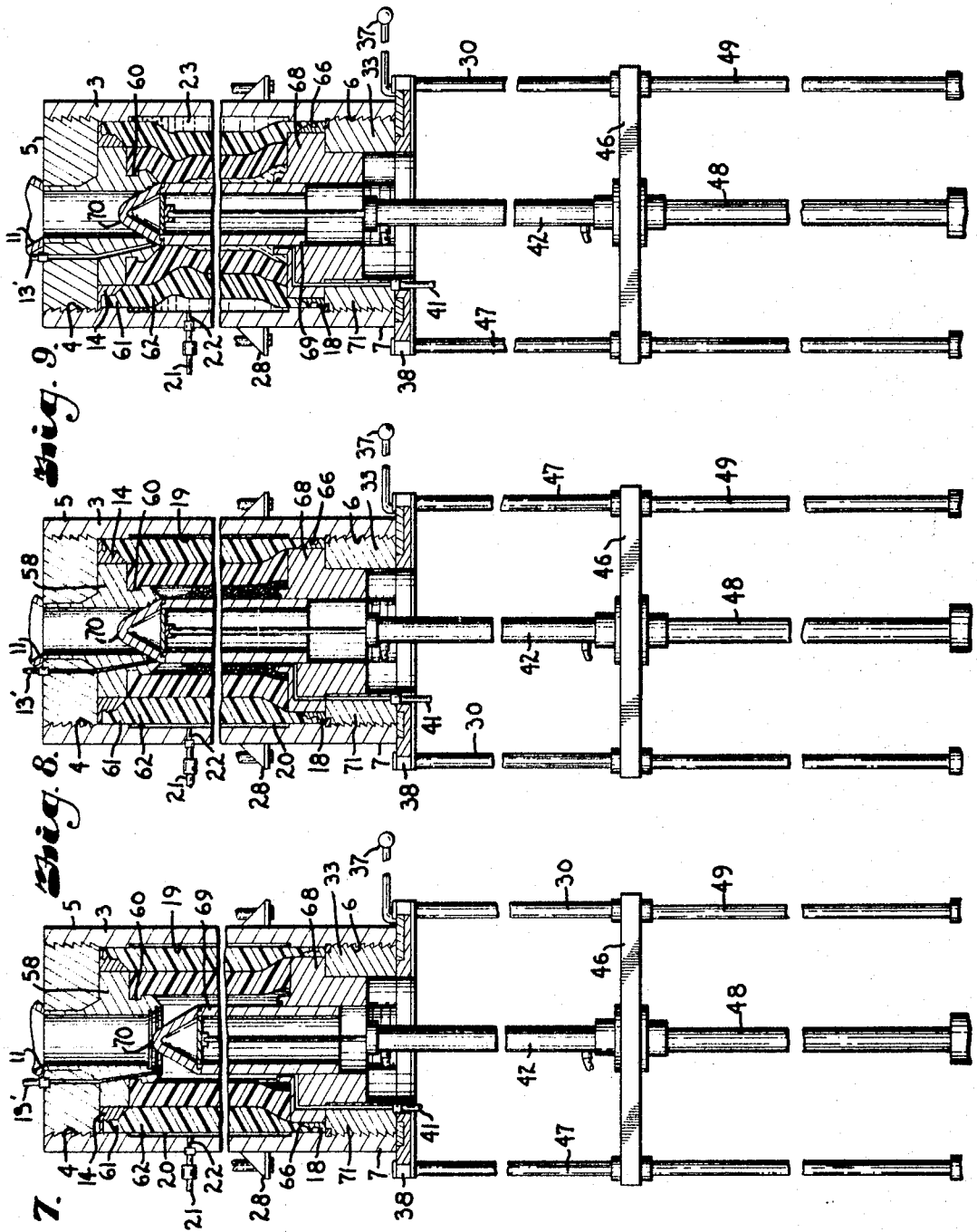

July 15, 1969
E. R. LIGON ETAL
3,454,997
CERAMIC MOLDING APPARATUS
Filed Nov. 30, 1965
6 Sheets-Sheet 4
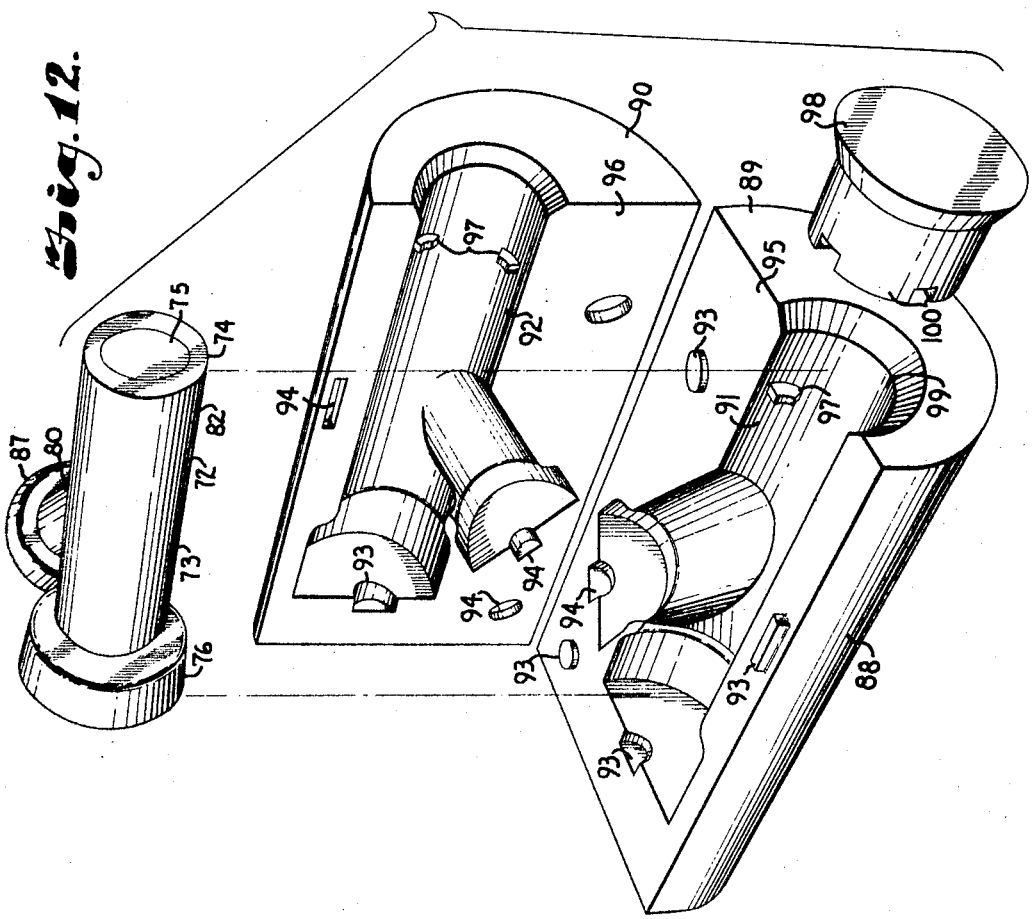
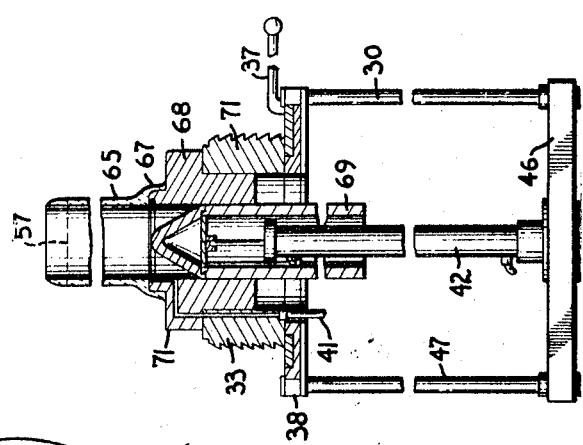
INVENTOR.
ELMER R. LIGON, NORMAN D. REED and
FRANK E. DE GASPERI
BY Fishburn & Gold
ATTORNEYS

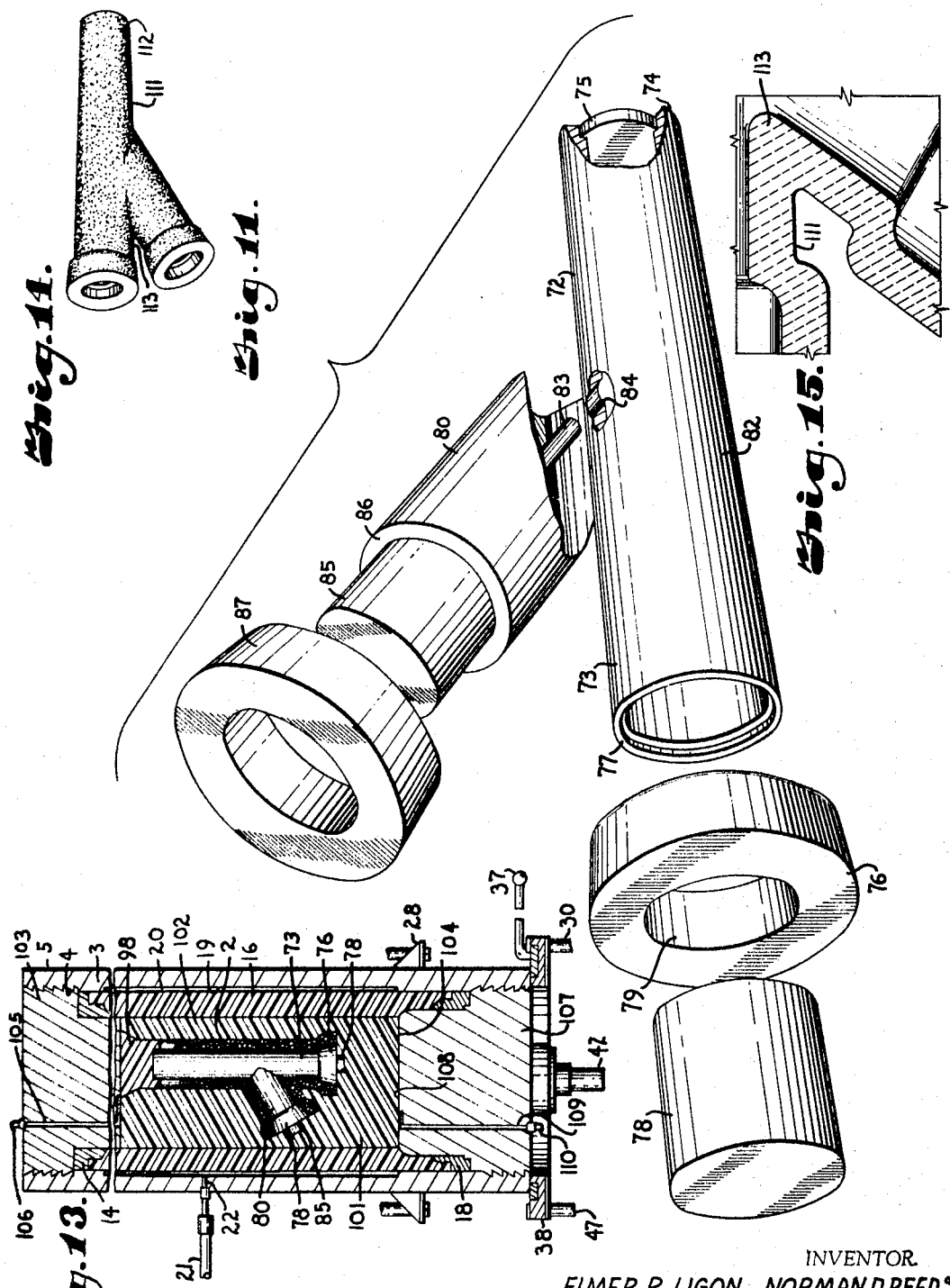

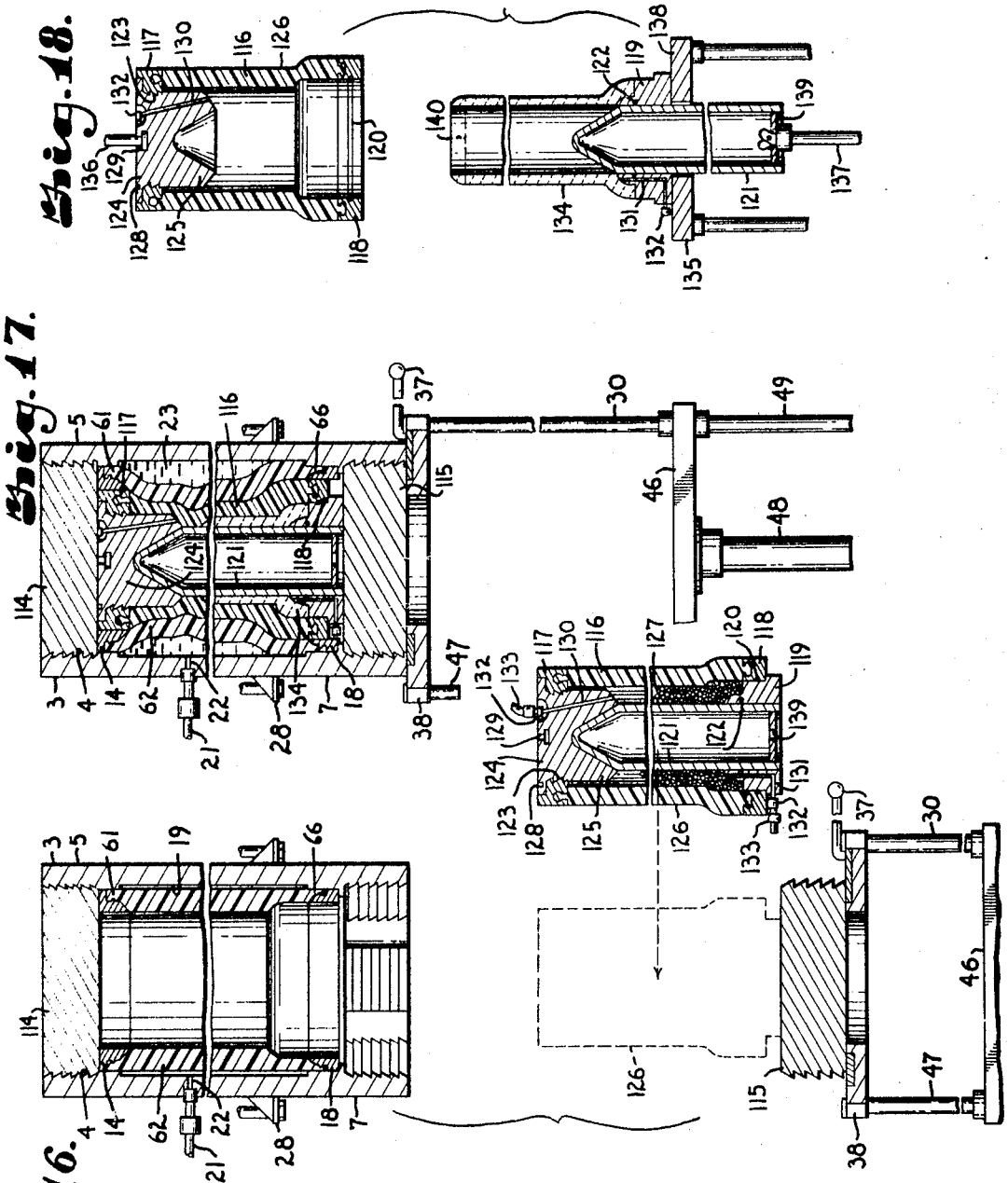

United States Patent Office 3,454,997
Patented July 15, 1969

3,454,997
CERAMIC MOLDING APPARATUS
Elmer R. Ligon, Frank E. De Gasperi, and Norman D. Reed, Pittsburg, Kans., assignors, by direct and mesne assignments, of one-half to W. S. Dickey Clay Manufacturing Company, Kansas City, Mo., and one-half to Clow Corporation, Chicago, Ill., both corporations of Delaware
Filed Nov. 30, 1965, Ser. No. 510,504
Int. Cl. B28b *1/14, 7/10*
U.S. Cl. 25—30                                                  7 Claims

ABSTRACT OF THE DISCLOSURE

Apparatus for the production of molded articles such as clay pipe and fittings including a hollow shell with an elastomeric bladder therein with an inner surface to form the outer surface of the article. In clay pipe forming, the bladder has a bell shape portion at one end that cooperates with an internal bell former that is inserted therein and a rigid mandrel slidably extends through a bell former bore to form the inner surface of the cavity, said mandrel cooperating with an end of the shell opposite the bell former to form an entrance for material, removal of air, and a valve to close the cavity when properly filled. Fluid pressure against the bladder forms the material in the mold and then the mandrel is withdrawn, stripping the mandrel from the pipe against the bell former. A second bladder surrounds and contacts the first bladder and pressure by hydraulic fluid is applied to the exterior of the second bladder so that the pressure is transmitted therethrough to the second bladder and the material being molded. This form permits the first bladder to be removed from the shell and to be of a split construction for facilitating removal of the molder articles. An elastomeric bladder is formed of separable sections and has depressions therein with mandrels completely suspended in the elastomeric material and cooperating with the walls forming the depressions to provide cavities to receive material to be molded whereby the molded article is wholly contained in the removable bladder.

This invention relates to improvements in the apparatus and method for the production of ceramic articles such as clay pipe and related connecting members and, more particularly, to such improvements using isostatic molding and the articles produced thereby.

Manufacturing clap pipe by isostatic or "dry press" molding presents several distinct advantages over the common practice of forming by extrusion, for example, elimination of the expensive and time consuming drying step preliminiunary to firing, less handling of soft or "green" pipe, better dimensional control resulting from greatly reduced shrinkage and distortion, and greater wall strength and body homogeneity. The method and apparatus heretofore suggested for the commercial production of clap pipe by isostatic molding, however, is expensive to build, cumbersome in use, requires the extensive duplication of heavy structure for molding pipe of different sizes, and make no provision for the unitary formation of related pipe connecting members, which cannot be linearly stripped from a mold, such as T's, Y's, elbows, traps and the like, known as "multiple cavity" articles.

The last named articles usually have tubular sections extending at an angle to each other and joined at a junction. The common practice in manufacturing such articles is to form the tubular sections separately and then joint them in the green state by cutting approximate shapes and openings which match required contours and then connect the sections with added plastic clay and excess water to make a seal at the junction. The success of this procedure depends largely upon manual skill and even a highly skilled worker requires considerable time and virtually ideal conditions to produce dimensionally acceptable fired articles with strong, leak-free junctions. Efforts to improve the quality and uniformity of such multiple cavity articles have primarily centered around the use of special complex cutting devices to more closely match the sections at the junction and/or vibrating or hammering devices to produce a better seal, but generally have not been successful in showing marked improvements. Further efforts in this regard have included extruding a plastic clay mass into a closed rigid, transversely separable mold having split mandrels therein, but the product has not proved sufficiently uniform to warrant commecial production by this method.

The principal objects of the present invention are: to provide improved isostatic pressure applying apparatus which permits the rapid, uniform and efficient molding and stripping of clay pipe and the like; to provide such apparatus which allows the rapid and simple conversion to the production of different pipe sizes; to provide such apparatus which uses the same pressure retaining housing and wet wall bladder in producing pipe of different sizes; to provide isostatic pressure applying apparatus adapted to efficiently produce clay pipe related multiple cavity articles; to provide a process and apparatus for producing such multiple cavity articles which have body homogeneity and high strength throughout, even at the junction of tubular sections; to provide such a multiple cavity article producing apparatus wherein the major portions thereof may be utilized efficiently for molding linear stripped articles; to provide such apparatus which permits a vacuum to be drawn and maintained in the mold cavity at a location remote from the pressure retaining housing; and to provide high quality multiple cavity clay pipe articles at low cost.

Other objects and advantages of this invention will become apparent from the following description taken in connection with the accompanying drawings wherein are set forth by way of illustration and example certain embodiments of this invention.

FIG. 1 is a vertical cross-sectional view through isostatic clay pipe forming apparatus embodying this invention showing the internal structure thereof with the lower seal block assembly completely withdrawn.

FIG. 2 is a view similar to FIG. 1 but showing the seal block assembly engaged in the mold housing and the charging valve open.

FIG. 3 is a view similar to FIG. 2 but showing the charging valve closed after the mold chamber has been charged with clay particles.

FIG. 4 is a view similar to FIG. 3 but showing hydraulic fluid under pressure in the apparatus resulting in pressing the clay particles.

FIG. 5 is a view similar to FIG. 4 but showing the pressure relieved and the lower seal block assembly lowered with the mandrel stripped downwardly from the formed clay pipe.

FIG. 6 is a vertical cross sectional view showing the apparatus of FIGS. 1–5 modified for isostatically forming clay pipe of smaller diameter.

FIG. 7 is a view similar to FIG. 6 but showing the apparatus in clay particle charging position.

FIG. 8 is a view similar to FIG. 7 but showing the apparatus charged with clay particles and the charging valve closed.

FIG. 9 is a view similar to FIG. 8 but showing hydraulic fluid under pressure in the apparatus, the pressure being transmitted isostatically through a wet-wall and dry-wall bladder to the clay particles.

FIG. 10 is a view similar to FIG. 9 but showing the pressure relieved and the lower seal block assembly lowered with the mandrel stripped downwardly from the smaller diameter pipe.

FIG. 11 is an exploded perspective view on a scale larger than FIGS. 1–10 showing a split mandrel for use in forming a multiple cavity clay pipe article by the isostatic process.

FIG. 12 is an exploded perspective view showing the assembled mandrel of FIG. 11 positioned for receipt into an elastomeric split mold.

FIG. 13 is a vertical cross-sectional view showing the apparatus of FIGS. 1–5 modified for receipt of the closed split mold of FIG. 12 with the mandrel of FIG. 11 and a charge of clay particles therein.

FIG. 14 is a perspective view showing an isostatically formed clay pipe Y molded in the apparatus as modified in FIG. 13.

FIG. 15 is a detailed fragmentary cross-sectional view on an enlarged scale showing a portion of the junction between tubular sections of the Y of FIG. 14 illustrating the homogeneous body structure achieved.

FIG. 16 is a view similar to FIG. 1 but showing modified upper and lower seal blocks for the housing and a modified dry-wall bladder assembly forming a sealed and charged mold cavity, the dry-wall bladder assembly being adapted for drawing and maintaining a vacuum in the cavity at a location remote from the housing.

FIG. 17 is a view similar to FIG. 16 but showing the dry-wall bladder assembly locked in the housing and hydraulic fluid under pressure in the apparatus resulting in pressing the charge.

FIG. 18 is a vertical cross-sectional view showing the modified dry-wall bladder assembly of FIG. 16 with the bell former plug and mandrel stripped downwardly.

Referring to the drawings in more detail:

The reference numeral 1 generally indicates isostatic molding apparatus embodying this invention wherein processed clay particles 2 having a closely controlled relatively low moisture content are pressed into desired shape prior to firing.

The molding apparatus 1 includes a housing in the form of a cylindrical wall 3 of sufficient strength to withstand maximum pressure to be applied therein. The wall 3 has suitable heavy internal threads 4 at an open upper end 5 and heavy internal quick-acting grooves or threads 6 at an open lower end 7 thereof, the threads 6 being preferably of the type found in the breech of large guns for receiving and securely locking breech blocks therein with a fractional turn.

The open upper end 5 has an upper seal block 8 threadedly engaged therein and supporting a valve seat 9 centrally thereof. The valve seat 9 includes a central vertical bore 10 extending through the upper seal block 8 and communicating with a feeder funnel 11 through which the particles 2 may be introduced into the molding apparatus by a suitable weighing and charging device (not shown). The valve seat 9 has a downwardly directed conical sealing or engaging surface 12 which is interrupted by circular grooves 12' communicating with a passageway 13 extending through the valve seat body and seal block 8 and connecting to a vacuum hose 13' for a purpose noted below.

An upper retainer and ring seal 14 is engaged with the cylindrical wall 3 and maintained in sealing contact with the vale seat 9. The upper ring seal 14 engages and supports the upper end 15 of a cylindrical wet-wall elastomeric cylinder or bladder 16 in sealing contact with the inside surface of the wall 3. The wet-wall bladder 16 is preferably formed of a flexible synthetic resin which flows easily under pressure but returns fully to its original shape after withdrawal of pressure, such as a suitably compounded polyurethane. The lower end 17 of the wet-wall bladder 16 is engaged with a lower retainer and ring seal 18 which maintains the end 17 in sealing engagement with the inside surface of the wall 3. The cylindrical wall 3 has an elongated slightly recessed portion 19 extending into the inside surface thereof and forming a normally thin cylindrical chamber 20 surrounding and opening against the outer surface of the wet-wall bladder 16 and extending between the bladder ends 15 and 17. An hydraulic fluid line 21 communicates through a passageway 22 in the wall 3 with the chamber 20 for introducing hydraulic fluid 23 (FIG. 4) thereinto under pressure as noted below. The fluid line 21 connects to a suitable hydraulic fluid pump (not shown) for controlling the hydraulic fluid pressure within the chamber 20. The outer surface of the bladder 16 thus comprises the "wet-wall," the inside surface 24 thereof never being exposed to the hydraulic fluid. The inside surface 24 is cylindrical along the effective length thereof except near the bladder lower end 17 where it is shaped at 25 to form the outside molding surface of the bell end 26 of the clay pipe 27 (FIG. 5) formed by the apparatus.

The above-described parts are suitably suspended above the ground by brackets 28 in a position coaxially spaced vertically from a lower seal block assembly 29 which is supported on a suitable elevator 30. The lower seal block assembly 29 includes a rigid internal bell mold or former 31 which when received within and adjacent the wet-wall bladder at 25, forms the inside surface of the pipe bell end 26. The bell former 31 has an axially directed lip 32 which is telescopically received within a cylindrical lower seal block 33. The bell former 31 also has a downwardly directed flange 34 which rests on an upper surface 35 of the lower seal block 33 whereby the bell former is axially located with respect to and supported on the lower seal block 33.

The lower seal block 33 is adapted to be received upwardly into the lower open end 7 formed by the cylindrical wall 3 and has retaining grooves or threads 36 on the outside surface thereof adapted to engage with the threads 6 for securely and rapidly locking the lower seal block therein with a relatively small relative rotation therebetween. In the illustrated example, such rotation is accomplished by means of a suitable arm 37 which is rigidly connected to the lower end of the seal block 33, the seal block 33 being rotatably mounted on a support platform 38 forming part of the elevator 30 whereby the block may be rotated with the arm 37 relative to both the cylindrical wall 3 and the elevator 30. A passageway 39 extends through the bell former 31 and the lower seal block 33 nad communicates between the inside cylindrical surface 40 of the bell former 31 and an external vacuum hose 41 extending beneath the platform 38 for a purpose noted below.

The elevator 30 has a central cylinder 42 associated therewith which extends coaxially downwardly of the bell former 31 and wet-wall bladder 15. The cylinder 42 supports a central mandrel 43 which slidably extends into and engages the inside cylindrical surface 40 of the bell former 31. The mandrel 43 is rigid and hollow whereupon the cylinder 42 extends axially upwardly thereinto. In the illustrated example, the supporting structure between the cylinder 42 and mandrel 43 comprises a plate 44 secured to the upper end of the mandrel 43 and engaging the piston rod 45 of the cylinder 42. The elevator 30 includes a platform or rigid structure 46 which supports the lower end of the cylinder 42 and upwardly extending legs 47 which provide vertical and torsional support for the platform 38. The platform 46 is selectively raised and lowered by a suitable hydraulic cylinder 48. Telescoping guides 49 maintain the entire elevator structure sufficeintly rigid and suitably positioned in extending condition. The cylinder 42 acts as a mandrel elevator and, as further noted below, operates independently of the cylinder 48.

A conical charging valve core 50 has the base thereof engaged with the upper end of the mandrel 43 and moves therewith axially within the bell former 31. The upper or pointed end of the charging valve core 50 is adapted to be received into the feeding bore 10 whereupon the exterior sloping surface 51 engages with the sealing surface 12 of the valve seat 9. When, however, the charging valve core 50 is partially withdrawn downwardly to a position illustrated in FIG. 2, the surfaces 51 and 12 form a conical passageway 52 which provides communication between the bore 10 and the mold chamber 53 formed between the bladder 16 and the mandrel 43.

For an explanation of operation, refer to FIGS. 1 through 5 in sequence. FIG. 1 illustrates the lower seal block assembly in its lowermost position beginning the operating cycle. In FIG. 2, the elevator 30 has moved the lower seal block assembly upwardly into the open lower end of the cylinder wall 3 and the arm 37 has been utilized to lock the lower seal block 33 to the cylinder wall. The cylinder 42 or mandrel elevator is shown extended to a postiion where the mandrel has telescoped through the bell former 31 upwardly to a position where the charging valve core 50 is spaced somewhat downwardly from the valve seat, forming the conical charging passageway 52. A charging device (not shown) is then utilized to discharge a measured quantity of prepared clay particles 2 into the feeder funnel 11 from which it is directed to the conical passageway 52 into the mold chamber 53 as illustrated in FIG. 3, whereupon the central cylinder 42 is again actuated to raise the charging valve core 50 into sealing contact with the valve seat 9. A vacuum is drawn in the hoses 13' and 41 to exhaust air in the mold chamber 53, preventing entrapped air from causing defects in the pipe body. Hydraulic fluid 23 is then pumped into the chamber 19 through the fluid line 21 and, as the pressure rises therein, the wet-wall bladder 16 is deformed into pressing contact with the particles 2 as illustrated in FIG. 4.

It is noted that the particle charge does not completely fill the mold chamber 53 since upon release of pressure, the molded material expands both transversely and longitudinally, and room must be provided for such expansion. After the desired pressure has been applied, the hydraulic fluid is relieved of pressure, and allowed to flow out of the chamber 19 through the fluid line 20 whereupon the bladder 15 resumes its original shape and pulls slightly away from the outside surface 54 of the pipe 27. The transverse expansion of the molder pipe causes the pipe inside surface 55 to pull slightly away from the outside or molding surface of the mandrel 43. Further, the dry condition of the pipe body tends to eliminate the tendency to adhere to a mold surface which is associated with the higher moisture content extruded clays. Thus, as illustrated in FIG. 5, the elevator 30 may be lowered after releasing the lower seal block 33 and the pipe 27 will easily strip from the inside surface 24 of the bladder 15. As the lower seal block assembly 29 is lowered, the cylinder 42 may simultaneously be actuated to withdraw the mandrel 43 downwardly against the bell former 31, thus causing the mandrel to strip from the inside surface 55. This leaves the molded pipe 27 resting on the upper end of the bell former 31 for easy removal and transfer to the firing oven. Because the upper end of the pipe 27 is molded into a sharp or feathered edge, a portion 56 is normally trimmed off to a line 57 whereupon the pipe is squared for proper receipt into the bell end of an adjacent pipe. After removal of the pipe 27, the lower seal block assembly 29 is raised upwardly into the lower open end 7 and the above steps repeated.

In FIGS. 6 to 10, the structure described above in connection with FIGS. 1 to 5 is modified so as to product clay pipe of a smaller diameter by the isostatic method and like parts have been given like reference numerals.

Referring to FIGS. 6 to 10, the valve seat 9 is replaced with a valve seat 58 which has a radial lower flange 59 forming a circular groove 60 receiving and supporting the upper end 61 of a dry-wall elastomeric cylinder or bladder 62 of the same or similar material as the bladder 16. The bladder 62 has an outside surface 63 of substantially the same size and shape as the inside surface 24 and thus essentially forms an inner continuation of the wet-wall bladder 16 reducing the effective inside diameter thereof. The inside surface 64 of the dry-wall bladder 62 forms the mold for the exterior surface of a clay pipe 65 (FIG. 10) of smaller diameter than the pipe 27. The lower end 66 of the dry-wall bladder 62 is curved on the inside surface 64 so as to form the exterior bell shape of the pipe bell end 67. The bell former 68 in the modified form of FIGS. 6 to 10 has a smaller bore diameter than the bell former 31 for slidably receiving a correspondingly smaller mandrel 69 and charging valve core 70. Thus, by merely replacing the valve seat assembly, adding a dry-wall bladder supported by the new valve seat and replacing the bell former and mandrel assembly, the structure of FIGS. 1 to 5 is rapidly and easily modified so as to produce pipe of smaller diameter. The expensive and relatively bulky cylinder wall 3, its supporting structure and the auxiliary equipment such as the pumps and elevator need not be altered or replaced and hydraulic fluid connections need not be broken.

The operation of the modified molding apparatus of FIGS. 6 to 10 is identical to that noted above in connection with FIGS. 1 to 5 inclusive; FIG. 6 showing the lower seal block assembly 71 withdrawn downwardly; FIG. 7 showing the assembly 71 engaged within the cylinder wall and the mandrel 69 positioned for receiving a particle charge thereagainst; FIG. 8 showing the clay particle charge in the mold cavity and the charging valve closed; FIG. 9 showing the pressure applied deforming both the wet-wall and dry-wall bladder inwardly and thereby compressing the clay particles against the mandrel; and FIG. 10 showing the smaller diameter pipe 65 stripped from the dry-wall bladder and the mandrel.

Referring to FIG. 11, there is illustrated a mandrel 72 used in accordance with this invention to produce a multiple cavity article, in this example, clay pipe Y's by the isostatic method. The mandrel 72 comprises an elongated rigid tubular portion 73 sealed at the rear end 74 thereof with a rigid plug 75 and having an axially movable collar 76 at the other end thereof abuttable against a shoulder 77. A removeable cylindrical plug 78 is telescopically directed through a central bore 79 formed in the collar 76 and into the tubular portion 73. Thus, both the plug 78 and collar 79 are easily removable from the tubular portion 73 by withdrawal axially thereof. A stub cylinder 80 is shaped at one end 81 thereof to conform against the central portion 82 of the tubular portion 73 so as to form a Y junction therewith. A pin 83 extends axially rearwardly of the stub cylinder 80 and is telescopically received over the protrusion 85 and when it the wall of the tubular portion 73. The stub cylinder 80 has at the other end thereof a protrusion 85 of reduced diameter forming a shoulder 86. A collar 87 is telescopically received over the protrusion 85 and when it rests against the shoulder 86, a portion of the protrusion 85 extends through and beyond the collar 87. Thus, the mandrel 72, when assembled, conforms to the inside shape of a clay pipe Y connector and the plug 78 and outer end of the protrusion 85 form mounting pins for centering the mandrel 72 in a split mold 88 described below.

The split mold 88 is preferably formed of an elastomeric material similar to the bladders 16 and 62 and is comprised of two halves 89 and 90 split along a plane containing the longitudinal axis of the cylinder formed when the halves are joined face to face. The halves 89 and 90 of the split mold 88 each have depressions 91 and 92 respectively therein which form the mold surface for the exterior of the Y connector. The depressions 91 and 92 include recesses 93 and 94 for receiving and engaging the mandrel plug 78 and protrusion 85 when the mandrel 72 is assembled and placed in the mold cylinder. Mating protrusions 93 and recesses 94 are provided on the facing surfaces 95 and 96 of the split mold to align the halves 89 and 90 when the mold is closed. Projections 97 are provided in the depressions 91 and 92 to center the mandrel near the rear end 72 of the tubular portion 73. A plug 98, preferably of the same material as the mold, is used to seal off a charging opening 99 which remains after the halves are closed into face contacting relationship. The plug 98 has axially projecting fingers 100 which engage the end 74 of the tubular portion 73 and the surface forming the depressions 91 and 92 to further help center the mandrel in the split mold after charging.

When the halves of the split mold are assembled with the mandrel 72 therein, it forms a cylinder 101 with the charging opening 99 providing access into the mold cavity 102 formed between the mandrel and the surface of the depressions 91 and 92. A charge of clay particles 2 may then be inserted through the charging opening 99 into the mold cavity 102 and the plug 98 inserted to close the charging opening. The resulting cylinder has an outside diameter and length which is adapted to be received into the cylindrical wall 3 in sliding contact with wet-wall bladder 16. To prepare the molding apparatus for the cylinder 101, the upper seal block 8 and valve seat 9 of FIGS. 1 to 5 are removed and replaced by a simple upper seal block 103 (FIG. 13) which has a continuous flat depending lower surface 104 for engaging the flat upper surface of the assembled split mold. A vacuum passageway 105 communicates with a vacuum hose 106 (corresponding to the hose 13') for use in withdrawing air from the mold cavity prior to compression. The lower seal block assembly 29 of FIGS. 1 to 5 is removed and replaced by a seal block 107 which provides a continuous upper surface 108 to support the lower end surface of the assembled split mold. A vacuum passageway 109 and vacuum hose 110 are used as an additional aid in withdrawing trapped air in the mold chamber prior to applying pressure. The hydraulic fluid is pumped into the chamber 20 in the manner noted above which, in turn, causes the wet-wall bladder 16 to press isostatically against the split mold cylinder 101 which transfers the forces isostatically to the clay particle charge surrounding the essentially floating mandrel 72. The cylinder 101 thus becomes a dry-wall bladder functioning generally in the manner of the dry-wall bladder 62.

After the desired pressure is applied, the lower seal block 107 is lowered and with it the cylinder 101. The cylinder is then opened and the mandrel 72 withdrawn with the Y fitting 111 therearound. The various parts of the mandrel are disassembled and withdrawn from the fitting which, after trimming the end 112, is normally ready for firing.

The wall structure of the fitting 111 is dense and homogeneous, not exhibiting the variations in structure and moisture content at the spur tube juncture 113 (FIG. 15) which is normally associated with present hand-joined or machine-joined fittings. Thus, after firing, a multiple cavity article is produced which has uniform high structural strength throughout and does not tend to leak, crack or show weakness at critical points.

If desired, several multiple cavity or more simply shaped articles can be pressed simultaneously in the split mold elastomeric cylinder by providing the desired shaped depressions and required mandrel for each article, so long as sufficient room is available.

The time required to draw a sufficient vacuum in the mold chamber may constitute a serious production limiting factor. To overcome this, the described structure may be modified so that the dry-wall bladder comprises a wall of a movable closeable container assembly forming a selectively sealed mold cavity. This permits a vacuum to be drawn in the mold cavity before the container is inserted into the wet-wall bladder in the pressure housing for pressure application. Thus, vacuum may be drawing in different stages within several charged containers while the pressure housing is in use.

Referring to FIG. 16, the housing wall 3 is depicted with simple upper and lower seal blocks 114 and 115. The dry-wall bladder 116 carries upper and lower rigid rings 117 and 118 sealed at upper and lower ends thereof. The lower ring 118 slidably receives an internal bell former block 119 upwardly thereinto and seals thereagainst with a sliding ring seal 120. A core mandrel 121 slidably extends upwardly into the bell former block 119 and seals thereagainst with a sliding ring seal 122. The upper ring 117 includes internal threads 123 and receives a removable closure cap 124 thereinto which threadedly engages with the threads 123 to selectively close the open upper end of the dry-wall bladder 116. The cap 124 has a depending central portion 125 forming a downwardly open conical depression for receiving and centering the upper end of the mandrel 121. The portion 125 also acts as a supporting wall to prevent excessive deflection of the dry-wall bladder 116.

The interior of the dry-wall bladder 116, the cap 124, mandrel 121 and block 119 together form a closed container 126 having a mold cavity 127 therein adapted for receiving a charge of clay particles 2 by removing the cap 124. Suitable engaging tool depressions 128 are formed in the top of the cap 124 to aid in removing and replacing the cap. A grasping socket 129 associated with the cap 124 for lifting the container 126. Vacuum passageways 130 and 131 extend through the cap 124 and block 119 and open into the cavity 127. The passageways 130 and 131 communicate near the outer surface of the container 126 with vacuum hose coupling valve members 132 which are adapted to selectively engage vacuum hoses 133 for drawing a vacuum in the cavity 127 and be disengaged therefrom without permitting air flow back into the cavity.

In production, a plurality of cotainers 126 may be used for each pressure applying housing. The cap 124 is removed, exposing the cavity 127, and the clay particle charge inserted. The cap 124 is then replaced sealing the cavity with the charge therein. Vacuum may then be drawn in the cavity through the hoses 133 at a location remote from the housing as illustrated in FIG. 16. Thus, as the vacuum is being drawn, the housing is free for use in compressing another container 126. When sufficient time has elapsed to insure proper removal of gas from the clay charge, the hoses 133 are disconnected and the container placed upon the lower seal block 115 (broken lines, FIG. 16) and, in this example, elevated into the housing and compressed (FIG. 17). After pressure application, the container 126 is displaced downwardly and may be removed to a location remote from the housing for stripping the formed pipe 134 therefrom (FIG. 18). In stripping, the container 126 is preferably placed onto a suitable elevator mechanism 135 and a suspending member 136 engaged in the socket 129 for withdrawing the dry-wall bladder 116 and cap 124 upwardly after the vacuum has been relieved in the cavity through operation of the coupling members 132. A suitable grasping member 137 may be extended upwardly through the platform 138 of the elevator mechanism 135 to engage a draw bar 139 secured to the mandrel 121 for stripping same downwardly through the bell former block 119. This permits the pipe 134 to be removed and, as above, trimmed at 140 prior to firing. The container 126 is then reassembled for receiving another charge.

If it is desired to draw a vacuum on a multiple cavity type member charge prior to insertion into the housing for pressing, the split mold of FIG. 12 may be assembled and placed in a suitable flexible walled bag (not shown) from which the air may be drawn so as to create a vacuum in the mold cavity, and then the bag with the split mold therein inserted into the pressure applying housing as noted.

Although certain forms of this invention have been illustrated and described, it is not to be limited thereto except insofar as such limitations are included in the claims.

We claim:
1. Apparatus for the production of bell and clay pipe comprising:
   (a) a vertically extending pressure resisting housing having an upper end and a lower end and an inner surface forming a vertical bore therethrough,
   (b) an upper seal block assembly secured to said housing and closing said upper end, said upper seal block assembly having a clay charging bore extending therethrough and a valve seat surface surrounding said charging bore and directed downwardly into said housing bore,
   (c) a vertically extending elastomeric bladder in said housing bore and having an upper end sealed with respect to said housing inner surface, said bladder having a lower end sealed with respect to said housing inner surface and an inside surface forming the external shape of a clay pipe including a bell forming portion adjacent said bladder lower end,
   (d) means supporting said housing with said housing lower end elevated, a lower seal block assembly, elevator means adapted to selectively raise and lower said lower seal block assembly into and out of engagement with said housing lower end, said lower seal block assembly including an internal bell former adapted to be received upwardly into said housing bore to a position at least partially within said bladder bell forming portion, said bell former having a vertical bore therethrough,
   (e) a vertically extending rigid mold mandrel axially movable through said bell former bore and into said bladder, a mandrel elevator connected to said seal block elevator and bodily movable therewith, said mandrel elevator engaging said mandrel and adapted to selectively reciprocate same vertically through said bell former and into said bladder, a charging valve core mounted at the upper end of said mandrel for engaging said valve seat surface to close said charging bore upon the upward reciprocation of said mandrel into said bladder,
   (f) means for directing hydraulic fluid under pressure between said housing inner surface and said bladder for urging said bladder inwardly toward said mandrel and bell former, to compress clay therebetween into a pipe shape defined by cooperating surfaces of the bladder, mandrel and bell former,
   (g) said seal block elevator being operable after release of said fluid pressure to lower said bell former and mandrel elevator to withdraw the pipe from within the bladder,
   (h) said mandrel elevator being operative to withdraw said mandrel from the pipe through said bell former for stripping said mandrel from the pipe against said bell former.

2. In apparatus for the production of bell and clay pipe:
   (a) pressure molding structure comprising a hollow shell with opposed ends,
   (b) an inwardly deformable elastomeric bladder in said shell and having end portions supported therein in sealed relation thereto, said bladder having an inside surface for forming the outside surface of the clay pipe, said inside surface having a bell shaped portion adjacent one end for forming the outside bell end surface of the pipe,
   (c) an internal bell former, elevator means for selectively inserting said bell former at least partially within said bell shaped portion for forming the inside bell end surface of the pipe, said bell former having a bore therethrough normally axially aligned with said bladder inside surface,
   (d) a rigid mandrel normally positioned within said bladder inside surface and spaced therefrom to define a mold cavity therebetween, said mandrel forming the inside surface of the pipe, said mandrel slidably extending through said bell former bore, a mandrel elevator mounted on the bell former elevator means and bodily movable therewith,
   (e) means cooperating with the mandrel enclosing the end of said mold cavity in the bladder remote from the bell former,
   (f) means applying fluid pressure to said bladder to compress material in the mold cavity between the bladder, mandrel and bell former, to form a pipe, said bladder releasing said pipe upon release of said fluid pressure,
   (g) said bell former elevator means being operable after release of said fluid pressure to lower said bell former and mandrel elevator to withdraw the pipe from within the bladder,
   (h) said mandrel elevator being operable for withdrawing said mandrel from the pipe through said bell former for stripping said mandrel from the pipe against said bell former.

3. In apparatus for the production of molded articles:
   (a) a pressure resisting housing having an inside surface defining a hollow interior,
   (b) a first inwardly deformable elastomeric bladder in said housing interior and having an outside surface exposed to said housing inside surface and an inside surface defining a chamber,
   (c) means for directing hydraulic fluid under pressure into said housing between and against said housing inside surface and said first bladder outside surface for urging said first bladder inwardly of said chamber, and
   (d) a second inwardly deformable elastomeric bladder selectively receivable in said chamber, said second elastomeric bladder comprising separable portions having normally contacting faces,
   (e) said contacting faces of the second elastomeric bladder having matching depressions therein having surfaces forming a moldable material receiving mold cavity and the outside mold surface of the article,
   (f) whereupon molding pressure is applied to said material through a bladder not exposed to hydraulic fluid.

4. The apparatus as set forth in claim 3 including:
   (a) a rigid mandrel entirely enclosed in said second bladder depressions forming the inside mold surface of the article, and
   (b) means cooperating between said mandrel and said second bladder to maintain said mandrel positioned in said depressions,
   (c) whereby said mandrel is completely suspended in elastomeric material.

5. The apparatus as set forth in claim 4 where:
   (a) said depressions are shaped to produce a clay pipe fitting having joined tube sections, and
   (b) said mandrel comprises a plurality of assembled parts movable axially of the respective tube sections to permit stripping said mandrel from the fitting after removal from said second bladder.

6. The apparatus as set forth in claim 3 including:
   (a) means associated with said second bladder and independent of said housing for sealing said moldable material receiving cavity against air leakage thereinto, and
   (b) means communicating with said cavity for drawing and maintaining a vacuum in said cavity during transfer and receipt of said second bladder into said first bladder.

7. In apparatus for the production of bell end clay pipe:
   (a) pressure molding structure comprising a hollow shell with opposed ends, (b) an inwardly deformable elastomeric bladder in said shell and having end portions supported therein in sealed relation thereto, said bladder having an inside surface for forming the outside surface of the clay pipe, said inside surface having a bell shaped portion adjacent one end for forming the outside bell end surface of the pipe, (c) a second inwardly deformable elastomeric bladder in the shell end surrounding an contactting said first named bladder, said second bladder being adapted to have hydraulic fluid pressure applied thereto and operating to transmit the pressure to said first named bladder without exposing said first bladder to hydraulic fluid, (d) an internal bell former, means for selectively inserting said bell former at least partially within said bell shaped portion for forming the inside bell end surface of the pipe, said bell former having a bore therethrough normally axially aligned with said first named bladder inside surface, (e) a rigid mandrel normally positioned within said first named bladder inside surface and spaced therefrom to define a mold cavity therebetween, said mandrel forming the inside surface of the pipe, said mandrel slidably extending through said bell former bore, (f) means cooperating with the mandrel enclosing the end of said mold cavity in said first named bladder remote from the bell former, (g) means applying fluid pressure to said second named bladder to compress material in the mold cavity between the first named bladder, mandrel and bell former, (h) means for withdrawing said mandrel from the pipe through said bell former for stripping said mandrel from the pipe against said bell former.

References Cited

UNITED STATES PATENTS

| | | | |
|---|---|---|---|
| 1,166,562 | 1/1916 | Tunison | 25—39 X |
| 1,460,451 | 7/1923 | Smith | 25—30 |
| 1,504,834 | 8/1924 | Robbins. | |
| 1,585,845 | 5/1926 | Flam | 249—63 X |
| 1,782,412 | 11/1930 | Dietrichs | 25—30 |
| 2,296,018 | 9/1942 | Boyle | 25—30 |
| 2,152,738 | 4/1939 | Jeffery | 264—313 |
| 2,628,402 | 2/1953 | Billner | 25—30 X |
| 2,730,783 | 1/1956 | Kennison | 25—30 |
| 2,865,079 | 12/1958 | Marchioli et al. | 264—314 |
| 2,937,421 | 5/1960 | Taccone | 25—30 X |
| 2,966,713 | 1/1961 | Billner | 25—30 |
| 2,983,021 | 5/1961 | Maillard | 25—30 XR |
| 3,151,195 | 9/1964 | Lafferty | 264—313 X |
| 3,193,900 | 7/1965 | Wendt | 264—314 X |
| 3,239,591 | 3/1966 | Wendt | 264—314 |
| 3,034,191 | 5/1962 | Schaefer et al. | |

WILLIAM J. STEPHENSON, Primary Examiner

U.S. Cl. X.R.

25—120